(12) United States Patent
Tsukiji et al.

(10) Patent No.: US 8,947,056 B2
(45) Date of Patent: Feb. 3, 2015

(54) CONTROL CIRCUIT FOR STEP-UP SWITCHING REGULATOR

(75) Inventors: Nobukazu Tsukiji, Kyoto (JP); Kazuhiro Murakami, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 266 days.

(21) Appl. No.: 13/463,906

(22) Filed: May 4, 2012

(65) Prior Publication Data

US 2012/0286756 A1   Nov. 15, 2012

(30) Foreign Application Priority Data

May 13, 2011 (JP) .................................. 2011-108663
Apr. 23, 2012 (JP) .................................. 2012-098098

(51) Int. Cl.
*H02M 1/32* (2007.01)
*H02M 3/158* (2006.01)

(52) U.S. Cl.
CPC ................ *H02M 1/32* (2013.01); *H02M 3/158* (2013.01)
USPC ............................ 323/222; 323/231; 361/91.6

(58) Field of Classification Search
CPC .................................... H02M 1/32; H02H 7/10
USPC ...................... 323/222, 231; 361/91.6; 363/50
See application file for complete search history.

(56) References Cited

U.S. PATENT DOCUMENTS

| 6,366,070 B1* | 4/2002 | Cooke et al. ................... 323/284 |
| 7,091,705 B2* | 8/2006 | Hoshino et al. ............... 323/222 |
| 7,116,160 B2* | 10/2006 | Lee et al. ....................... 327/589 |
| 7,876,073 B2* | 1/2011 | Sohma .......................... 323/222 |
| 8,508,206 B2* | 8/2013 | Wan et al. ..................... 323/283 |
| 2002/0047732 A1* | 4/2002 | Akahori .......................... 327/93 |
| 2008/0079409 A1* | 4/2008 | Motomori et al. ............ 323/283 |

* cited by examiner

*Primary Examiner* — Harry Behm
(74) *Attorney, Agent, or Firm* — Fish & Richardson P.C.

(57) ABSTRACT

A switching transistor is arranged between a switching (SW) terminal and the ground terminal. An error amplifier amplifies the difference between the feedback voltage $V_{FB}$ that corresponds to the output voltage $V_{OUT}$ with a predetermined reference voltage $V_{REF}$ so as to generate an error voltage $V_{ERR}$. A pulse modulator generates a pulse signal $S_P$ having a duty ratio that is adjusted according to the error voltage $V_{ERR}$. A driver drives a switching transistor according to the pulse signal $S_P$. An overvoltage detection circuit generates an overvoltage protection (OVP) signal which is asserted when the voltage at the switching (SW) terminal becomes higher than a predetermined threshold voltage. When the OVP signal is asserted, a control circuit performs a predetermined protection operation.

18 Claims, 7 Drawing Sheets

CONTROL CIRCUIT FOR STEP-UP SWITCHING REGULATOR

BACKGROUND OF THE INVENTION

1. Field of the Invention

The present invention relates to a DC/DC converter.

2. Description of the Related Art

In order to convert a DC voltage having a given level into a DC voltage having another level, a switching regulator (DC/DC converter) is employed. Such a switching regulator includes a switching transistor, a rectifier, an inductor, and an output capacitor. By adjusting the duty ratio of the on/off operation of the switching transistor, such an arrangement is configured to stabilize its output voltage to a desired level.

Figure 1:
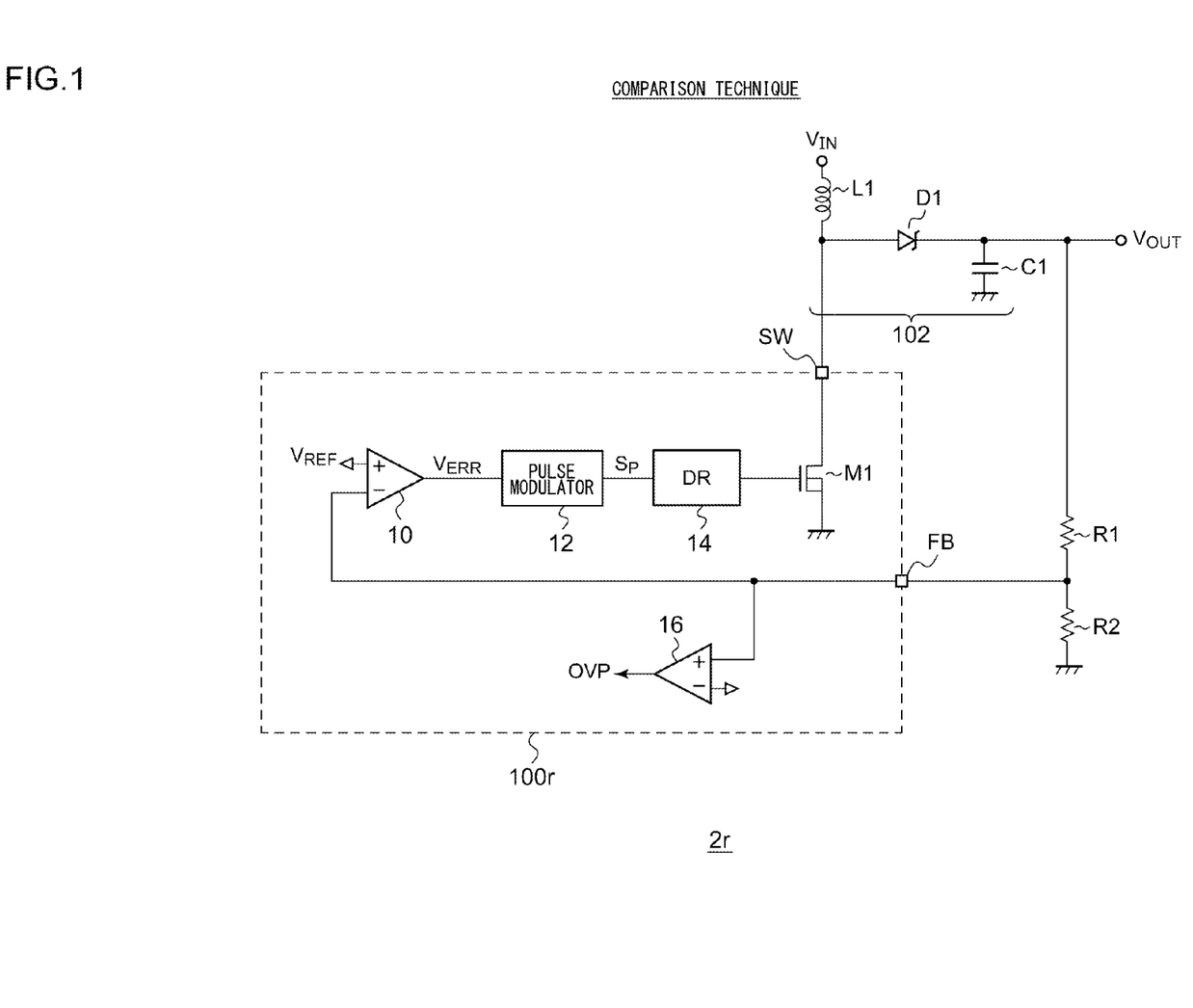
FIG. 1 is a circuit diagram which shows a configuration of a step-up switching regulator according to a comparison technique investigated by the present inventors.

FIG. 1 is a circuit diagram which shows the configuration of a step-up switching regulator according to a comparison technique investigated by the present inventors. A step-up switching regulator 2r mainly includes an output circuit 102, a control circuit 100r, and resistors R1 and R2.

The output circuit 102 includes an inductor L1, a diode D1, and an output capacitor C1. The output circuit 102 has a topology employed in a typical step-up circuit, and accordingly, description thereof will be omitted. A switching transistor M1 is connected to the output circuit 102. By switching the switching transistor M1, such an arrangement is configured to boost the input voltage $V_{IN}$ so as to generate a boosted output voltage $V_{OUT}$ at the output capacitor C1. The output voltage $V_{OUT}$ is divided by the first resistor R1 and the second resistor R2, and the voltage thus divided is fed back to a feedback terminal (FB terminal) of the control circuit 100r.

The control circuit 100r includes an error amplifier 10, a pulse modulator 12, a driver 14, and an overvoltage protection circuit 16, in addition to the switching transistor M1.

The error amplifier 10 is configured to amplify the difference between the feedback voltage $V_{FB}$ thus fed back to the FB terminal and a predetermined reference voltage $V_{REF}$ so as to generate an error voltage $V_{ERR}$. The pulse modulator 12 is configured to generate a pulse signal $S_P$ according to the error voltage $V_{ERR}$. The duty ratio of the pulse signal $S_P$ is adjusted such that the feedback voltage $V_{FB}$ matches the reference voltage $V_{REF}$. As such a pulse modulator 12, a pulse width modulator (PWM) or a pulse frequency modulator (PFM) is employed. The driver 14 is configured to perform switching of the switching transistor M1 according to the pulse signal $S_P$.

With such an arrangement, the output voltage $V_{OUT}$ of the switching regulator 2r is stabilized to the target level, i.e., $V_{REF} \times (R1+R2)/2R$.

Such a step-up switching regulator is configured to generate a high-level output voltage $V_{OUT}$. Thus, in order to protect the circuit, an overvoltage protection circuit 16 is arranged. The overvoltage protection circuit 16 is configured to compare the feedback voltage $V_{FB}$ with a predetermined threshold voltage $V_{TH}$, and to generate an overvoltage protection signal OVP which is asserted (e.g., set to high level) when $V_{FB} > V_{TH}$. That is to say, by means of the overvoltage protection circuit 16, such an arrangement is capable of detecting an overvoltage state. When the overvoltage protection signal OVP is asserted, the control circuit 100r is configured to perform a predetermined protection operation such as an operation for stopping the switching of the switching transistor M1.

The present inventors have investigated such a switching regulator 2r shown in FIG. 1, and have come to recognize the following problem.

External circuit components to be mounted on the control circuit 100r are electrically and mechanically mounted on a printed circuit board by means of solder. However, in some cases, such a circuit component could become disconnected from the printed circuit board due to various kinds of reasons.

If the rectifier diode D1 is disconnected from the control circuit 100r, no charge flows to the output capacitor C1, as a result of which the output voltage $V_{OUT}$ does not rise to the target level, i.e., remains at a low level. That is to say, the feedback voltage $V_{FB}$ remains lower than the reference voltage $V_{REF}$, which instructs the pulse modulator 12 to generate the pulse signal $S_P$ having a maximum duty ratio.

If the switching transistor M1 is instructed to perform a switching operation at the maximum duty ratio due to disconnection of the diode D1, the electric potential $V_{SW}$ at a connection node (SW terminal) that connects the switching transistor M1 and the inductor L1 steadily rises and exceeds the breakdown voltage of the switching transistor M1. This has a danger of affecting the reliability of the switching transistor M1.

The above-described consideration is by no means within the scope of common and general knowledge in the field of the present invention. Furthermore, it can be said that the present applicant has been the first to arrive at this consideration.

SUMMARY OF THE INVENTION

The present invention has been made in order to solve such a problem. Accordingly, it is an exemplary purpose of an embodiment of the present invention to provide a step-up switching regulator which is capable of solving a problem caused by the unexpected disconnection of a rectifier diode.

An embodiment of the present invention relates to a control circuit for a step-up switching regulator. The control circuit comprises: a switching terminal to which an inductor is connected; a switching transistor arranged between the switching terminal and a ground terminal; a feedback terminal configured to receive a feedback voltage that corresponds to an output voltage of the step-up switching regulator; an error amplifier configured to amplify the difference between the feedback voltage and a predetermined reference voltage so as to generate an error voltage; a pulse modulator configured to generate a pulse signal having a duty ratio that is adjusted according to the error voltage; a driver configured to drive the switching transistor according to the pulse signal; and an overvoltage detection circuit configured to compare the voltage at the switching terminal with a predetermined threshold voltage, and to generate an overvoltage protection signal which is asserted when the voltage at the switching terminal becomes higher than the threshold voltage. When the overvoltage protection signal is asserted, the control circuit is configured to perform a predetermined protection operation.

If the diode of the output circuit is disconnected, the electric potential at the switching terminal steadily rises. By comparing the electric potential at the switching terminal with the predetermined threshold voltage, such an arrangement is capable of detecting the overvoltage state at the switching terminal that occurs due to the diode being disconnected. Such an embodiment is capable of preventing the electric potential at the switching terminal from steadily rising and exceeding the breakdown voltage of the switching transistor even if the diode is disconnected.

Also, the overvoltage detection circuit may comprise: at least one Zener diode and a resistor sequentially arranged in series between the switching terminal and the ground terminal such that their cathodes are positioned on the switching terminal side; and a comparator configured to compare an electric potential at a connection node that connects the resistor and the Zener diode with a predetermined threshold voltage. Also, the overvoltage detection circuit may be configured to output the overvoltage protection signal that corresponds to an output voltage of the comparator.

With such an embodiment, in a state in which the electric potential at the switching terminal is high, a current flows through the Zener diodes. Thus, such an arrangement suppresses power consumption required for the overvoltage detection circuit when the circuit operates normally.

Also, the comparator may comprise an impedance element and a transistor sequentially arranged in series between a power supply terminal and the ground terminal such that an electric potential at a connection node that connects the resistor and the Zener diode is input to a control terminal of the transistor.

Also, the overvoltage detection circuit may comprise: two resistors sequentially arranged in series between the switching terminal and the ground terminal; and a comparator configured to compare an electric potential at a connection node that connects the two resistors with a predetermined threshold voltage. Also, the overvoltage detection circuit may be configured to output the overvoltage protection signal that corresponds to an output voltage of the comparator.

Also, the comparator may be configured as a voltage comparator. Also, the threshold voltage may be generated by means of a bandgap reference circuit.

Also, the overvoltage detection circuit may further comprise a switch arranged between the two resistors, and configured to perform a switching operation in a manner complementary to the switching operation of the switching transistor. Also, the overvoltage detection circuit may comprise: a diode arranged instead of the higher-voltage side resistor of the aforementioned two resistors; and a capacitor arranged in parallel with the lower-side resistor of the aforementioned two resistors.

Also, the pulse modulator may comprise: an oscillator configured to generate a set signal which is asserted for every predetermined cycle; a pulse width modulation comparator configured to compare a detection voltage that corresponds to a current that flows through the inductor with the error voltage, and to generate a reset signal which is asserted when the detection voltage becomes higher than the error voltage; and an SR flip-flop configured to be set when the set signal is asserted, and to be reset when at least one of the reset signal or the overvoltage protection signal is asserted, thereby outputting the pulse signal.

With such a control circuit configured to operate in peak current mode, by using the overvoltage protection signal as a reset signal for resetting the SR flip-flop, such an arrangement is capable of appropriately turning off the switching transistor in the overvoltage state.

Also, the voltage at the switching terminal may be employed as the detection voltage. Alternatively, the voltage drop that occurs at a resistor arranged on a path for the current that flows through the inductor may be amplified, and the voltage drop thus amplified may be employed as the detection voltage.

Also, the pulse modulator may comprise: an oscillator configured to generate a cyclic voltage having a triangle waveform or otherwise a sawtooth waveform having a predetermined period; a current amplifier configured to amplify the difference between a detection voltage that corresponds to a current that flows through the inductor and the error voltage; and a pulse width modulation comparator configured to compare the cyclic voltage with an output voltage of the current amplifier so as to output the pulse signal. When the overvoltage protection signal is asserted, the driver may be configured to turn off the switching transistor regardless of the level of the pulse signal.

With such a control circuit configured to operate in average current mode, such an arrangement is capable of appropriately turning off the switching transistor in the overvoltage state.

Also, the pulse modulator may comprise: an oscillator configured to generate a cyclic voltage having a triangle waveform or otherwise a sawtooth waveform having a predetermined period; and a pulse width modulation comparator configured to compare the cyclic voltage with the error voltage so as to output the pulse signal. When the overvoltage protection signal is asserted, the driver may be configured to turn off the switching transistor regardless of the level of the pulse signal.

With such a control circuit configured to operate in voltage mode, such an arrangement is capable of appropriately turning off the switching transistor in the overvoltage state.

Also, the pulse modulator may comprise: a pulse width modulation comparator configured to compare a detection voltage that corresponds to a current that flows through the inductor with the error voltage, and to generate a reset signal which is asserted when the detection voltage becomes higher than the error voltage; and a one-shot circuit configured to generate the pulse signal which is set to a first level during a predetermined off period after at least one from among the reset signal and the overvoltage protection signal is asserted, following which the pulse signal is returned to a second level.

With such a control circuit configured to operate in fixed off-time current mode, such an arrangement is capable of appropriately turning off the switching transistor in the overvoltage state.

Another embodiment of the present invention relates to a step-up switching regulator. The step-up switching regulator comprises: an output circuit comprising an inductor, a rectifier diode, and an output capacitor; and a control circuit according to any one of the aforementioned control circuits, which is connected to the output circuit.

yet another embodiment of the present invention relates to an electronic device. The electronic device comprises the aforementioned step-up switching regulator.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 2:
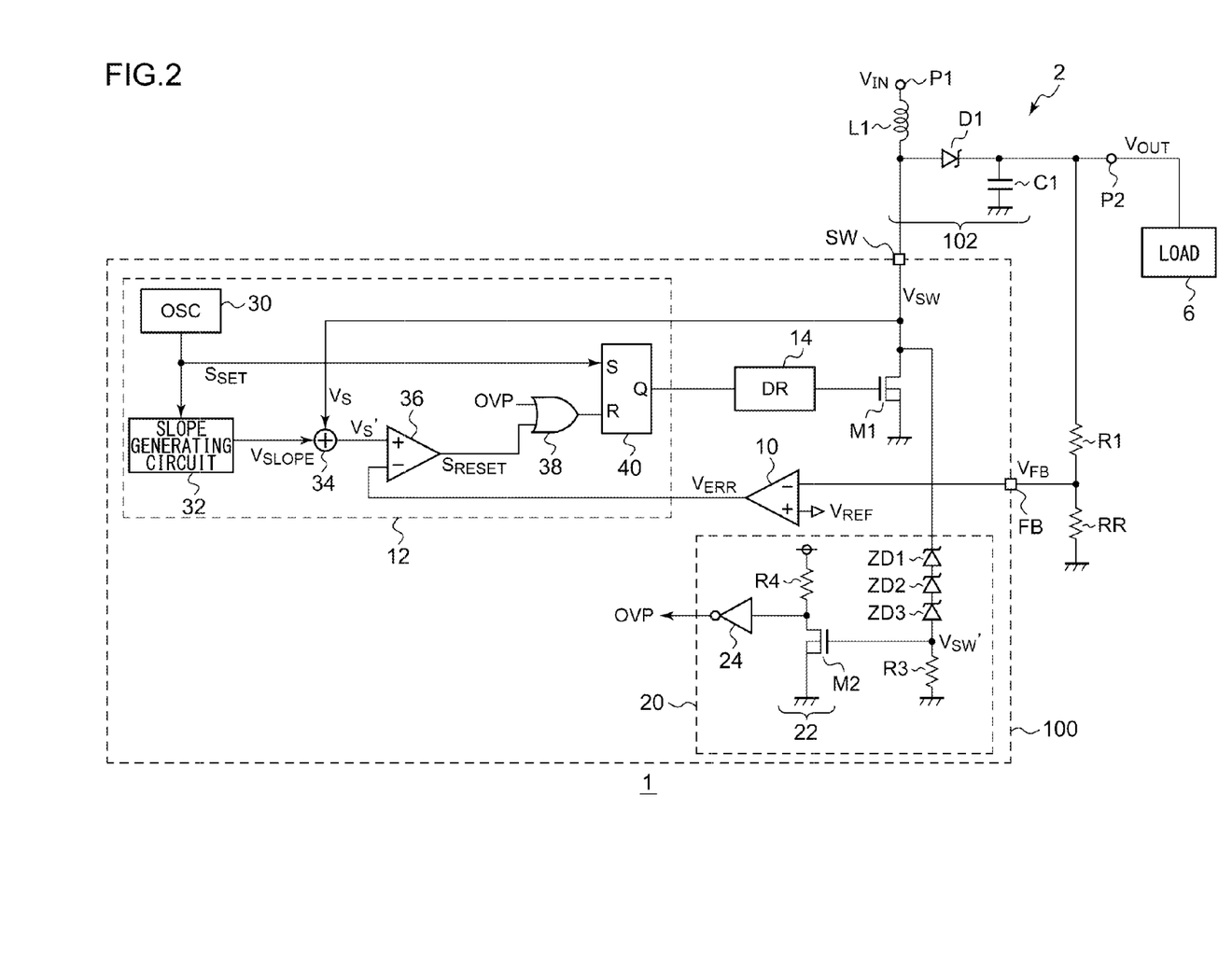
FIG. 2 is a circuit diagram which shows a configuration of an electronic device including a switching regulator according to an embodiment.

FIG. 2 is a circuit diagram which shows a configuration of an electronic device 1 including a switching regulator 2 according to an embodiment.

The electronic device 1 is configured as a battery-driven device such as a display device, such as a liquid crystal display, plasma display, or the like, a recorder or reader having a DVD disc drive, a Blu-ray disc drive, or a hard disk drive, a laptop PC, a digital still camera, a digital video camera, a cellular phone terminal, a PDA (Personal Digital Assistant), or the like, and includes a circuit block which requires high power supply voltage. Examples of such a circuit block include a liquid crystal driver, an LED (Light Emitting Diode), etc. The electronic device 1 corresponds to the load 6 shown in FIG. 1.

The electronic device 1 includes a step-up switching regulator 2 configured to supply, to the load 6, a power supply voltage that is higher than the battery voltage. An input voltage $V_{IN}$ is input to an input line P1 of the switching regulator 2. The switching regulator 2 is configured to boost the input voltage $V_{IN}$ so as to output an output voltage (power supply voltage) $V_{OUT}$ to an output line P2.

The switching regulator 2 is configured as a step-up DC/DC converter, and includes a control IC 100 and an output circuit 102. The output circuit 102 includes an inductor L1, a rectifier diode D1, and an output capacitor C1. The output circuit 102 has a typical topology, and accordingly, description thereof will be omitted.

The control circuit 100 includes a switching transistor M1, an error amplifier 10, a pulse modulator 12, a driver 14, and an overvoltage detection circuit 20, which are monolithically integrated on a single semiconductor substrate. Examples of such a "monolithically integrated" arrangement include: an arrangement in which all the circuit components are formed on a semiconductor substrate; and an arrangement in which principal circuit components are monolithically integrated. Also, a part of circuit components such as resistors and capacitors may be arranged in the form of components external to such a semiconductor substrate in order to adjust the circuit constants.

A switching terminal (SW terminal) of the control circuit 100 is connected to the inductor L1. The switching transistor M1 is arranged between the SW terminal and the ground terminal. The output voltage $V_{OUT}$ of the switching regulator 2 is divided by means of the first resistor R1 and the second resistor R2 so as to generate a feedback voltage $V_{FB}$. The feedback voltage $V_{FB}$, which is proportional to the output voltage $V_{OUT}$, is input to the feedback terminal (FB terminal).

The error amplifier 10 is configured to amplify the difference between the feedback voltage $V_{FB}$ and a predetermined reference voltage $V_{REF}$ so as to generate an error amplifier $V_{ERR}$.

The pulse modulator 12 is configured to generate a pulse signal $S_P$ having a duty ratio that is adjusted according to the error voltage $V_{ERR}$. The pulse modulator 12 may be configured as a pulse width modulator or a pulse frequency modulator. The configuration of the pulse modulator 12 is not restricted in particular.

The driver 14 is configured to drive the switching transistor M1 according to the pulse signal $S_P$.

The overvoltage detection circuit 20 is configured to compare the voltage $V_{SW}$ at the SW terminal with a predetermined threshold voltage $V_{TH}$. The overvoltage detection circuit 20 is configured to generate an overvoltage protection (OVP) signal which is asserted when the voltage $V_{SW}$ at the SW terminal becomes higher than the threshold voltage $V_{TH}$. The threshold voltage $V_{TH}$ is preferably set to be lower than the drain-source breakdown voltage of the switching transistor M1.

The overvoltage detection circuit 20 shown in FIG. 2 includes at least one or more Zener diodes ZD1 through ZD3 and a resistor R3 sequentially arranged in series between the SW terminal and the ground terminal. The Zener diodes ZD1 through ZD3 are arranged such that their cathode sides are each positioned on the SW terminal side.

The switching voltage $V_{SW}$ is level shifted by the Zener diodes ZD1 through ZD3, thereby generating a level-shifted voltage $V_{SW}'$ at a connection node that connects the resistor R3 and the Zener diode ZD3. With the number of Zener diodes as N (N represents an integer), and with the Zener voltage of each Zener diode as Vz, the relation Expression $V_{SW}' = V_{SW} - N \times Vz$ holds true.

The comparator 22 is configured to compare the electric potential $V_{SW}'$ at the connection node that connects the resistor R3 and the Zener diode ZD3 with the predetermined threshold voltage $V_{TH1}$. The comparator 22 shown in FIG. 2 includes a transistor M2 and a resistor R4. The resistor R4 that functions as an impedance element and the transistor M2 are sequentially arranged in series between the power supply voltage terminal and the ground terminal. The electric potential $V_{SW}'$ at a connection node that connects the resistor R3 and the Zener diode ZD3 is input to a control terminal (gate) of the transistor M2. The threshold voltage $V_{TH1}$ of the comparator 22 corresponds to the gate-source threshold voltage of the transistor M2.

The inverter 24 is configured to invert the output signal of the comparator 22 so as to output an OVP signal. With such an overvoltage detection circuit 20, the voltage $V_{SW}$ at the SW terminal is compared with $V_{TH} = V_{TH1}' + N \times Vz$.

When the OVP signal is asserted, the control circuit 100 performs a predetermined protection operation. The content of the protection operation is not restricted in particular. For example, in the protection operation, the switching transistor M1 in the on state may be forcedly turned off, or otherwise the switching of the switching transistor M1 may be stopped during a predetermined period of time.

FIG. 2 shows the control circuit 100 configured to operate in peak current mode. The pulse modulator 12 includes an oscillator 30, a slope generating circuit 32, an adder 34, a pulse width modulation (PWM) comparator 36, an OR gate 38, and an SR flip-flop 40.

The oscillator 30 is configured to generate a set signal $S_{SET}$ which is asserted for every predetermined period. The set signal $S_{SET}$ is input to a set terminal of the SR flip-flop 40. The slope generating circuit 32 is configured to generate a slope voltage $V_{SLOPE}$ having a ramp waveform (sawtooth waveform) that is synchronous with the set signal $S_{SET}$.

The adder 34 is configured to add a detection voltage Vs, which corresponds to the current $I_L$ that flows through the inductor L1, to the slope voltage $V_{SLOPE}$ so as to correct the detection voltage Vs. In FIG. 2, as the detection voltage Vs, the electric potential at the SW terminal is employed. In the on period of the switching transistor M1, voltage drop $V_{SW}$, which is proportional to the current $I_L$ that flows through the inductor L1, occurs at the switching transistor M1. With such an arrangement, the on resistance of the switching transistor M1 is known. Thus, the voltage drop $V_{SW}$ that occurs at the switching transistor M1, i.e., the electric potential $V_{SW}$ at the SW terminal, can be employed as the detection voltage Vs.

The PWM comparator 36 is configured to compare the corrected detection voltage Vs' with the error voltage $V_{ERR}$, and to generate a reset signal $S_{RESET}$ which is asserted when the detection voltage Vs' becomes higher than the error voltage $V_{ERR}$.

The OR gate 38 is configured to generate the logical OR of the OVP signal and the reset signal $S_{RESET}$, and to input the logical OR thus generated to the reset terminal of the SR flip-flop 40.

That is to say, the SR flip-flop 40 is configured to be set (the output Q is set to high level) every time the set signal $S_{SET}$ is asserted. When at least one of the reset signal $S_{RESET}$ or the OVP signal is asserted, the SR flip-flop 40 is reset (the output Q is set to low level). The output Q of the SR flip-flop 40 is output as the pulse signal $S_P$.

Figure 3:
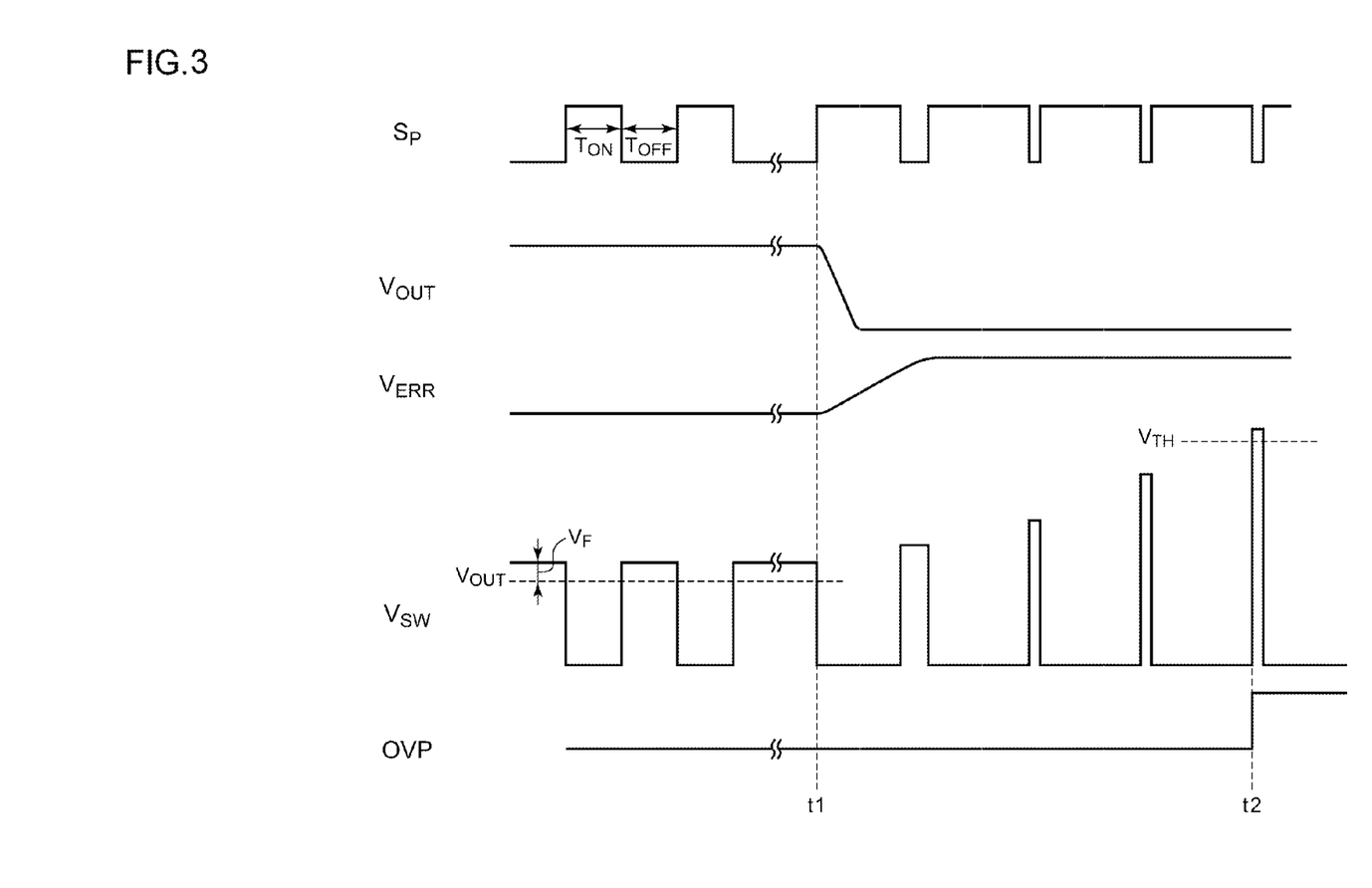
FIG. 3 is a waveform diagram which shows the operation of the switching regulator shown in FIG. 2.

The above is the configuration of the switching regulator 2 including the control circuit 100. Next, description will be made regarding the operation of the switching regulator 2. FIG. 3 is a waveform diagram which shows the operation of the switching regulator 2 shown in FIG. 2. Before the time point t1, the switching regulator 2 operates normally. In this period, the output voltage $V_{OUT}$ is stabilized at the target value. In the on period $T_{ON}$ of the switching transistor M1, the electric potential $V_{SW}$ at the SW terminal exhibits 0 V. In the off period $T_{OFF}$, the electric potential $V_{SW}$ exhibits a level in the vicinity of ($V_{OUT}$(output voltage)+$V_F$). Here, $V_F$ represents the forward voltage of the diode D1.

At the time point t1, the diode D1 is disconnected. This stops the supply of charge to the output capacitor C1. In this state, the output capacitor C1 is discharged via the load 6, and the output voltage $V_{OUT}$ drops. When the error voltage $V_{ERR}$ rises due to the drop in the output voltage $V_{OUT}$, the duty ratio of the pulse signal $S_P$ is raised, which increases the on period of the switching transistor M1.

Every time the switching transistor M1 is turned on, energy is stored in the inductor L1. However, in this case, the diode D1 has been disconnected. Accordingly, the energy thus stored cannot be transmitted to the output capacitor C1. As a result, in the off period of the switching transistor M1, the electric potential $V_{SW}$ at the SW terminal gradually rises. When the switching voltage $V_{SW}$ becomes higher than the threshold voltage $V_{TH}$ at the time point t2, the OVP signal is asserted. In this state, the switching transistor M1 is immediately turned off, thereby preventing the switching voltage $V_{SW}$ from rising further.

The above is the operation of the switching regulator 2.

As described above, with the switching regulator 2 according to the embodiment, such an arrangement is capable of preventing the electric potential $V_{SW}$ at the SW terminal from rising and exceeding the breakdown voltage of the switching transistor M1 even in a case in which the diode is unexpectedly disconnected.

Furthermore, with the control circuit 100 configured to operate in peak current mode, by using the OVP signal as a reset signal for resetting the SR flip-flop 40, such an arrangement is capable of appropriately turning off the switching transistor M1 in the overvoltage state.

With such an arrangement, the overvoltage detection circuit 20 is configured employing Zener diodes ZD. Thus, the current that flows through the overvoltage detection circuit 20 is substantially zero when the switching regulator 2 operates normally. That is to say, the current consumption of the control circuit 100 involved in the overvoltage detection circuit 20 is negligible. Also, such an arrangement allows the threshold voltage $V_{TH}$ to be adjusted according to the number of Zener diode ZD stages, which is another advantage.

Description has been made above regarding the present invention with reference to the embodiment. The above-described embodiment has been described for exemplary purposes only, and is by no means intended to be interpreted restrictively. Rather, various modifications may be made by making various combinations of the aforementioned components or processes. Description will be made below regarding such modifications.

Figure 4A:
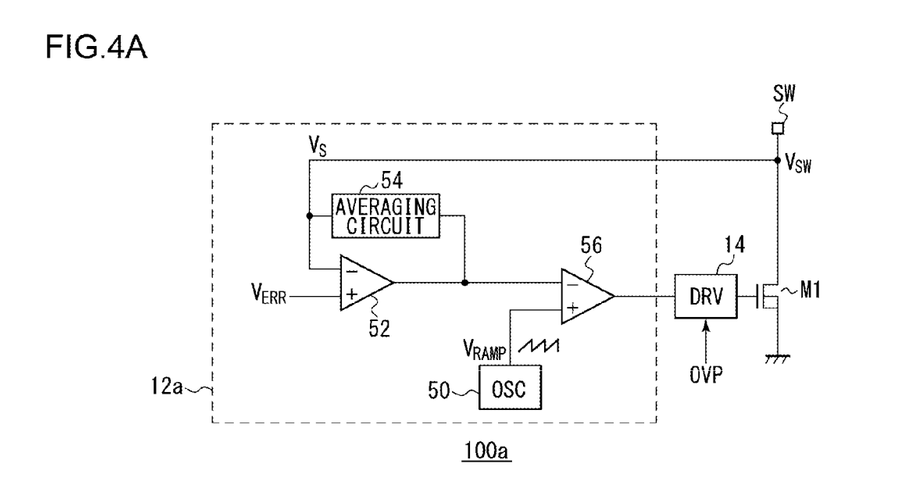
FIGS. 4A through 4C are circuit diagrams each showing a configuration of a control circuit according to a modification.
Figure 4B:
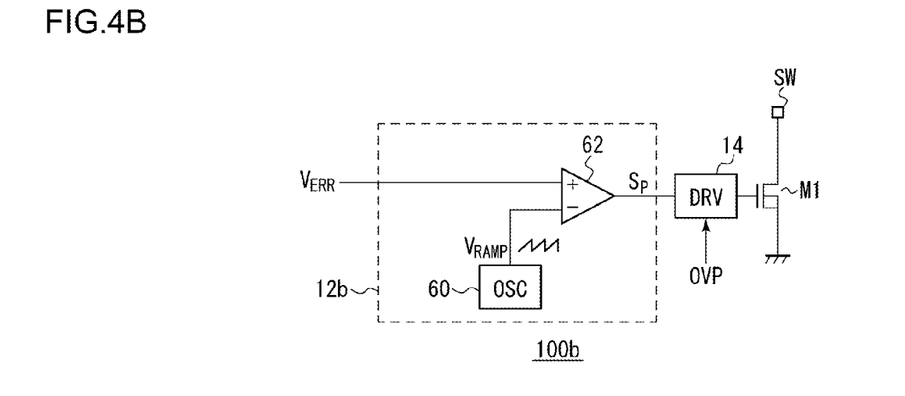
Figure 4C:
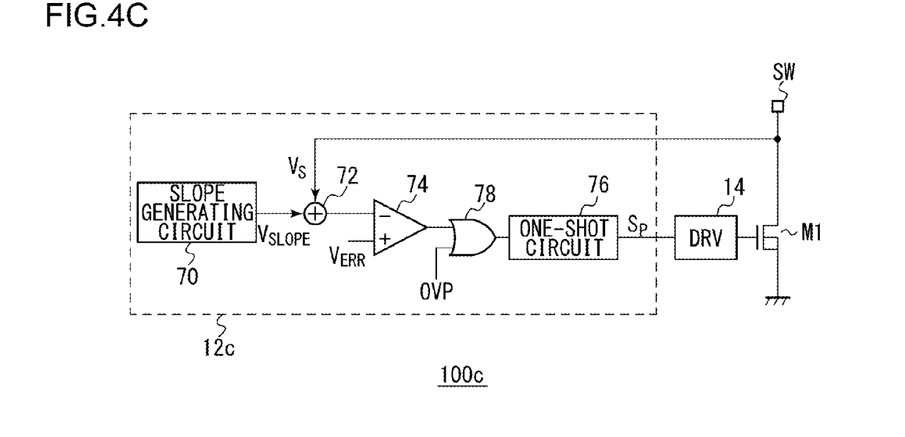

FIGS. 4A through 4C are circuit diagrams respectively showing control circuits 100a through 100c according to modifications.

FIG. 4A shows a control circuit 100a configured to operate in average current mode. A pulse modulator 12a includes an oscillator 50, a current amplifier 52, an averaging circuit 54, and a PWM comparator 56.

The oscillator 50 is configured to generate a cyclic voltage $V_{RAMP}$ having a triangle waveform or otherwise a sawtooth waveform having a predetermined period. The current amplifier 52 is configured to amplify the difference between the error voltage $V_{ERR}$ and the detection voltage Vs that corresponds to the current $I_L$ that flows through the inductor L1. The averaging circuit (filter) 54 is arranged between the output terminal and the inverting input terminal of the current amplifier 52 in order to perform phase compensation and averaging. The PWM comparator 56 is configured to compare the cyclic voltage $V_{RAMP}$ with the output voltage of the current amplifier 52, and to output a pulse signal $S_P$. When the OVP signal is asserted, the driver 14 is configured to turn off the switching transistor M1 regardless of the level of the pulse signal $S_P$.

FIG. 4B shows a control circuit 100b configured to operate in voltage mode. A pulse modulator 12b includes an oscillator 60 and a PWM comparator 62. The oscillator 60 is configured to generate a cyclic voltage $V_{RAMP}$ having a sawtooth waveform or otherwise a triangle waveform having a predetermined period. The PWM comparator 62 is configured to compare the cyclic voltage $V_{RAMP}$ with the error voltage $V_{ERR}$, and to output a pulse signal $S_P$. When the OVP signal is asserted, the driver 14 is configured to turn off the switching transistor M1 regardless of the level of the pulse signal $S_P$.

FIG. 4C shows a control circuit 100c configured to operate in fixed off-time current mode. A pulse modulator 12c includes a slope generating circuit 70, an adder 72, a PWM comparator 74, and a one-shot circuit 76. The slope generating circuit 70 is configured to generate a slope voltage $V_{SLOPE}$ having a ramp waveform (sawtooth waveform). The adder 72 is configured to add the slope voltage $V_{SLOPE}$ to the detection voltage Vs that corresponds to the current $I_L$ that flows through the inductor L1, so as to correct the detection voltage Vs. The PWM comparator 74 is configured to compare the corrected detection voltage Vs' with the error voltage $V_{ERR}$, and to generate a reset signal $S_{RESET}$ which is asserted when the detection voltage Vs' becomes higher than the error voltage $V_{ERR}$. The one-shot circuit 76 is configured to generate a pulse signal $S_P$ which is set to the first level (low level) during a predetermined off time $T_{OFF}$ after at least the reset signal $S_{RESET}$ or the OVP signal is asserted, and is returned to the second level (high level) after the off period $T_{OFF}$.

The control circuits 100a through 100c shown in FIGS. 4A through 4C each provide the same advantages as those of the control circuit 100 shown in FIG. 2. Also, the configuration of such a pulse modulator is not restricted to the configurations shown in FIG. 2 and FIGS. 4A through 4D, which can be clearly understood by those skilled in this art.

Description has been made in the embodiment regarding an arrangement in which the overvoltage detection circuit 20 is configured employing Zener diodes. However, the present invention is not restricted to such an arrangement. Also, an arrangement may be made in which the voltage $V_{SW}'$ is generated by voltage division using resistors. With such an arrangement, in a case in which such resistors are each configured to have a small resistance value, such an arrangement leads to a problem of increased circuit current consumption. Conversely, in a case in which such resistors are each configured to have a large resistance value, such a voltage dividing circuit functions as an undesired low-pass filter. Thus, such an arrangement has a problem in that it is difficult to design the resistance values of such resistors. However, such an arrangement has a simple configuration, which is an advantage. Also, a comparator having a differential amplifier may be employed as the comparator 22, and the voltage $V_{SW}'$ may be compared with a threshold voltage by means of such a voltage comparator.

Figure 5A:
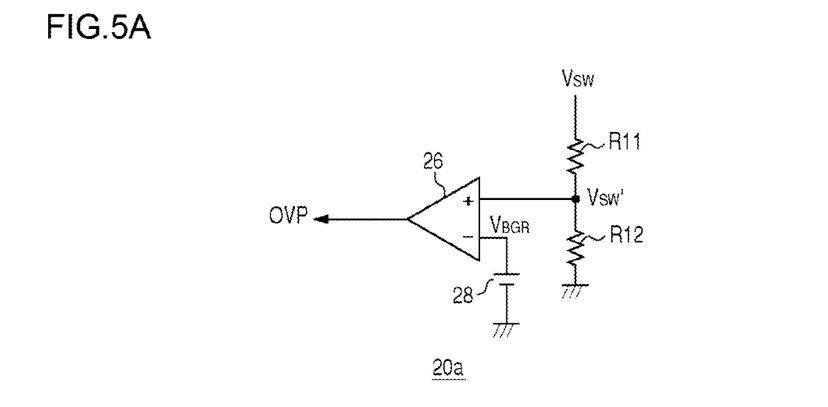
FIGS. 5A through 5C are circuit diagrams each showing a modification of an overvoltage detection circuit.
Figure 5B:
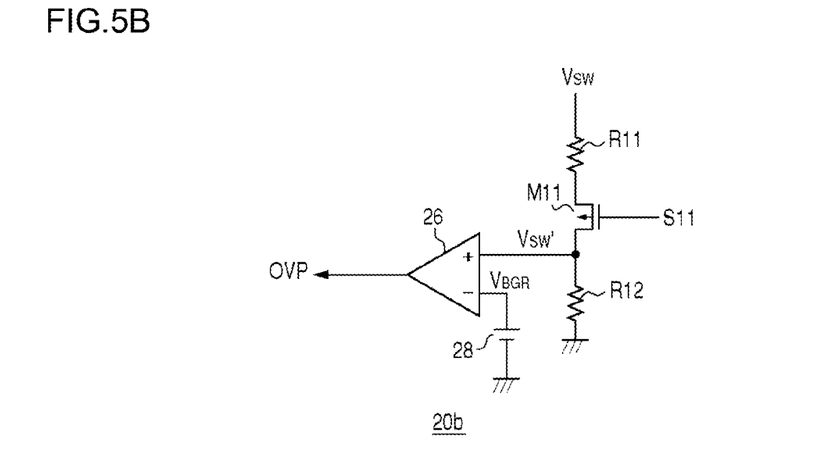
Figure 5C:
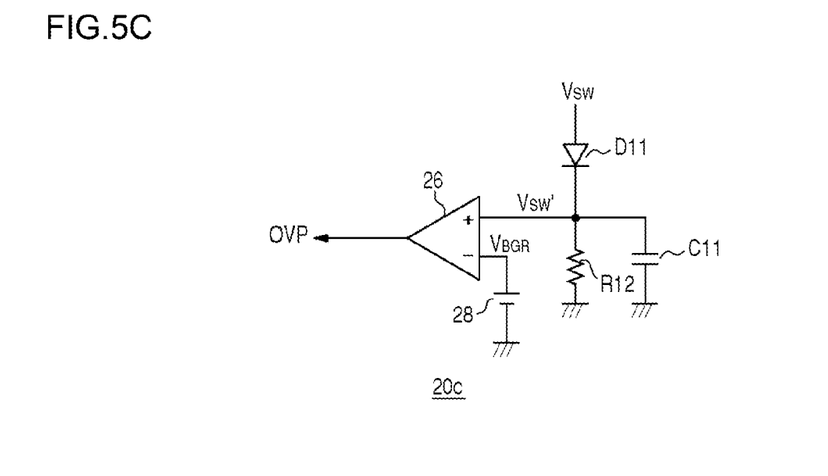

FIGS. 5A through 5C are circuit diagrams each showing a modification of the overvoltage detection circuit. An overvoltage detection circuit 20a shown in FIG. 5A includes resistors R11 and R12, a voltage comparator 26, and a reference voltage source 28. The resistors R11 and R12 are configured to divide the voltage $V_{SW}$ at the SW terminal so as to generate the voltage $V_{SW}'$. The reference voltage source 28 is configured as a bandgap reference circuit, for example, and is configured to generate a reference voltage $V_{BGR}$ that is independent of the temperature and the power supply voltage. The voltage comparator 26 is configured to compare the voltage $V_{SW}'$ with the reference voltage $V_{BGR}$, and to output the OVP signal which is asserted when $V_{SW}' > V_{BGR}$.

An overvoltage detection circuit 20b shown in FIG. 5B further includes a switch M11 configured to perform a switching operation according to a control signal S11, in addition to the overvoltage detection circuit 20a shown in FIG. 5A. The switch M11 is configured to be turned off when the switching transistor M1 is on, and to configured to be turned on when the switching transistor M1 is off. The switch M11 is configured as an N-channel MOSFET, for example. The control signal S11 may be configured as an inverted signal of the gate signal (output signal of the driver 14) to be supplied to the switching transistor M1. By providing such a switch M11, the overvoltage detection circuit 20b is set to the high-impedance state when the switching transistor M11 is in the on state. Thus, such an arrangement is capable of reducing the adverse effects of the overvoltage detection circuit 20b on the operation of the switching regulator.

An overvoltage detection circuit 20c shown in FIG. 5C further includes a diode D11 instead of the resistor R11 shown in FIG. 5A, and further includes a capacitor C11 connected in parallel with the resistor R12. With such a modification, the voltage $V_{SW}$ at the SW terminal can be smoothed by means of the capacitor C11. Thus, such an arrangement is capable of relaxing the high-speed responsiveness required for the voltage comparator 26. That is to say, such an arrangement allows a low-speed voltage comparator to be employed to detect the overvoltage state.

The settings of the logical signals have been described in the present embodiment for exemplary purposes only. The settings can be freely modified by inverting the signals using inverters or the like.

Figure 6:
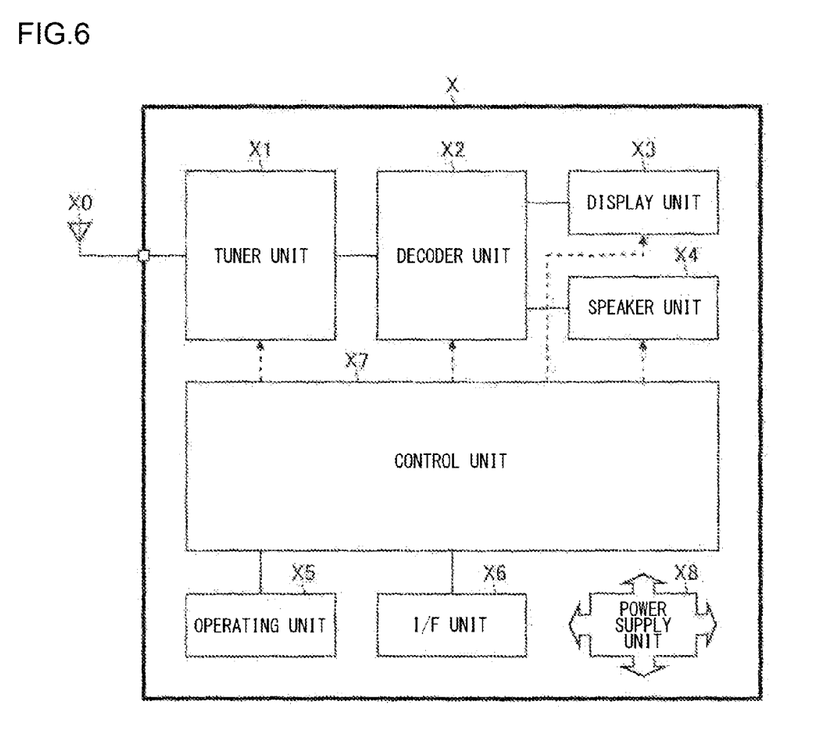
FIG. 6 is a block diagram which shows a configuration of an electronic device.
Figure 7A:
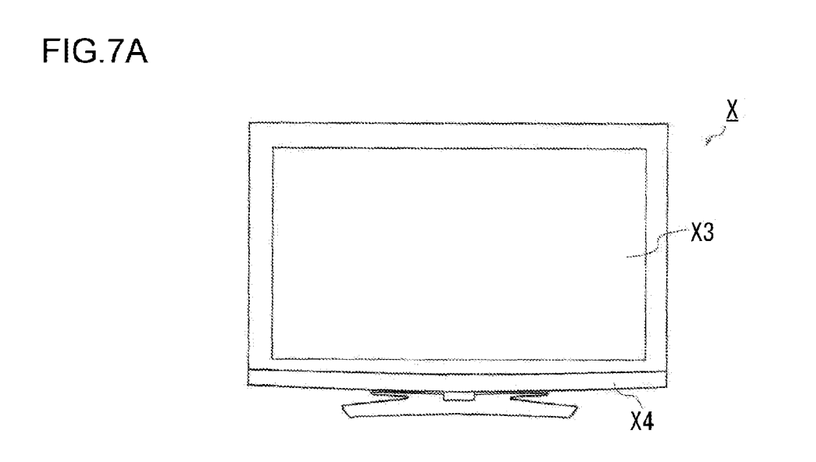
FIGS. 7A through 7C are external diagrams each showing an electronic device.
Figure 7B:
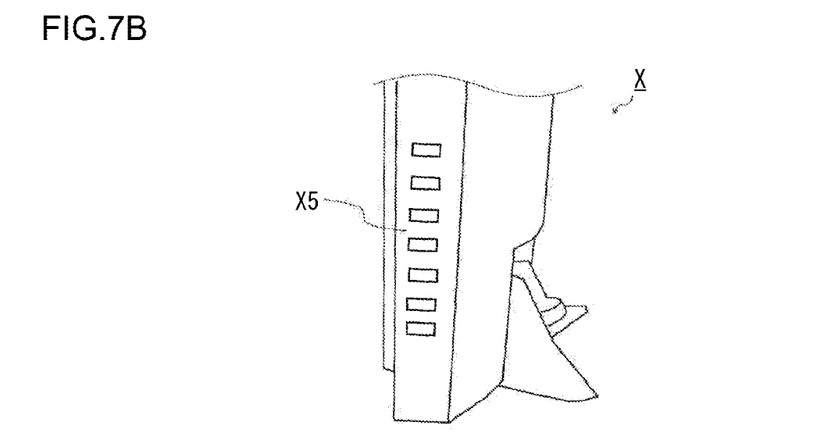
Figure 7C:
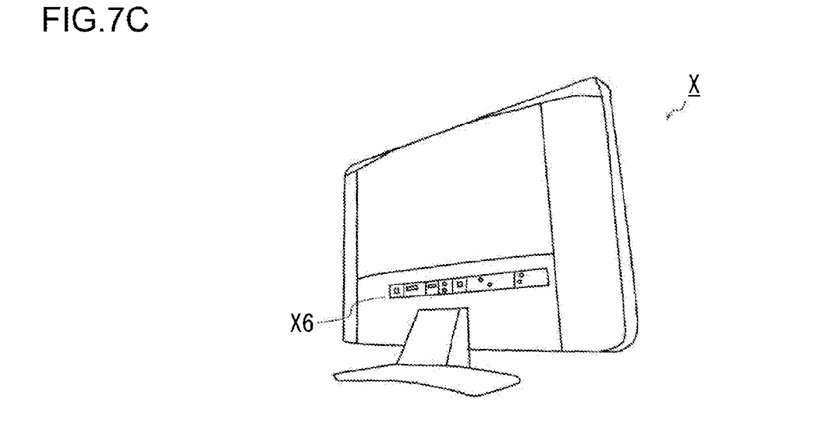

Lastly, description will be made regarding an example of an application of the switching regulator 2 according to an embodiment. The switching regulator 2 can be employed in an electronic device such as a TV. FIG. 6 is a block diagram which shows a configuration of an electronic device X. FIGS. 7A through 7C are external diagrams each showing the electronic device X. The electronic device includes an antenna X0, a tuner unit X1, a decoder unit X2, a display unit X3, a speaker unit X4, an operating unit X5, an interface (I/F) unit X6, a control unit X7, and a power supply unit X8.

The antenna X0 is configured to receive broadcast waves. The tuner unit X1 is configured to extract a signal having a predetermined frequency from among the broadcast waves received via the antenna X0, and to perform down-conversion of the signal thus extracted into a signal having a local frequency. The decoder unit X2 is configured to decode video data and audio data contained in the signal received from the tuner unit X1. The image data is displayed on the display unit X3, and the audio data is output via the speaker unit X4. The operating unit X5 is configured as an interface between the electronic device X and the user, and is configured to receive an instruction from the user to select a channel, to control the volume, and so forth. The I/F unit X6 is configured as an interface between the electronic device X and an unshown external electronic device. The control unit X7 is configured to control the tuner unit X1, the decoder unit X2, the display unit X3, and the speaker unit X4, according to the data received from the operating unit X5 or otherwise from the I/F unit X6. The power supply unit X8 is configured to supply the power supply voltage to each block mounted on the electronic device X. The switching regulator 2 according to the embodiment is suitably applicable to the power supply unit X8.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a step-up switching regulator comprising:
    a switching terminal to which an inductor is connected;
    a switching transistor arranged between the switching terminal and a ground terminal;
    a feedback terminal configured to receive a feedback voltage that corresponds to an output voltage of the step-up switching regulator;
    an error amplifier configured to amplify the difference between the feedback voltage and a predetermined reference voltage so as to generate an error voltage;

a pulse modulator configured to generate a pulse signal having a duty ratio that is adjusted according to the error voltage;
a driver configured to drive the switching transistor according to the pulse signal; and
an overvoltage detection circuit configured to compare the voltage at the switching terminal with a predetermined threshold voltage, and to generate an overvoltage protection signal which is asserted when the voltage at the switching terminal becomes higher than the threshold voltage while the switching transistor is off, wherein, when the overvoltage protection signal is asserted, the control circuit is configured to perform a predetermined protection operation, and wherein the overvoltage detection circuit comprises a switch arranged between two resistors and configured to perform a switching operation in a manner complementary to the switching operation of the switching transistor.

2. The control circuit according to claim 1, wherein the overvoltage detection circuit comprises:
at least one Zener diode and a resistor sequentially arranged in series between the switching terminal and the ground terminal such that each cathode thereof is positioned on the switching terminal side; and
a comparator configured to compare an electric potential at a connection node that connects the resistor and the Zener diode with a predetermined threshold voltage, wherein the overvoltage detection circuit is configured to output the overvoltage protection signal that corresponds to an output voltage of the comparator.

3. The control circuit according to claim 2, wherein the comparator comprises an impedance element and a transistor sequentially arranged in series between a power supply terminal and the ground terminal such that an electric potential at a connection node that connects the resistor and the Zener diode is input to a control terminal of the transistor.

4. The control circuit according to claim 1, wherein the overvoltage detection circuit comprises:
two resistors sequentially arranged in series between the switching terminal and the ground terminal; and
a comparator configured to compare an electric potential at a connection node that connects the two resistors with a predetermined threshold voltage; and
wherein the overvoltage detection circuit is configured to output the overvoltage protection signal that corresponds to an output voltage of the comparator.

5. The control circuit according to claim 4, wherein the comparator is configured as a voltage comparator, and wherein the threshold voltage is generated by means of a bandgap reference circuit.

6. The control circuit according to claim 1, wherein the overvoltage detection circuit comprises: a diode and a resistor arranged in series between the switching terminal and the ground terminal and a capacitor arranged in parallel with the resistor.

7. The control circuit according to claim 1, wherein the pulse modulator comprises:
an oscillator configured to generate a set signal which is asserted for every predetermined cycle;
a pulse width modulation comparator configured to compare a detection voltage that corresponds to a current that flows through the inductor with the error voltage, and to generate a reset signal which is asserted when the detection voltage becomes higher than the error voltage; and an SR flip-flop configured to be set when the set signal is asserted, and to be reset when at least one of the reset signal or the overvoltage protection signal is asserted, thereby outputting the pulse signal.

8. The control circuit according to claim 7, wherein a voltage at the switching terminal is employed as the detection voltage.

9. The control circuit according to claim 1, wherein the pulse modulator comprises:
an oscillator configured to generate a cyclic voltage having a triangle waveform or otherwise a sawtooth waveform having a predetermined period;
a current amplifier configured to amplify the difference between a detection voltage that corresponds to a current that flows through the inductor and the error voltage; and
a pulse width modulation comparator configured to compare the cyclic voltage with an output voltage of the current amplifier so as to output the pulse signal, and wherein, when the overvoltage protection signal is asserted, the driver is configured to turn off the switching transistor regardless of the level of the pulse signal.

10. The control circuit according to claim 1, wherein the pulse modulator comprises:
an oscillator configured to generate a cyclic voltage having a triangle waveform or otherwise a sawtooth waveform having a predetermined period; and
a pulse width modulation comparator configured to compare the cyclic voltage with the error voltage so as to output the pulse signal, and wherein, when the overvoltage protection signal is asserted, the driver is configured to turn off the switching transistor regardless of the level of the pulse signal.

11. The control circuit according to claim 1, wherein the pulse modulator comprises:
a pulse width modulation comparator configured to compare a detection voltage that corresponds to a current that flows through the inductor with the error voltage, and to generate a reset signal which is asserted when the detection voltage becomes higher than the error voltage; and
a one-shot circuit configured to generate the pulse signal which is set to a first level during a predetermined off period after at least one from among the reset signal and the overvoltage protection signal is asserted, following which the pulse signal is returned to a second level.

12. A step-up switching regulator comprising:
an output circuit comprising an inductor, a rectifier diode, and an output capacitor; and a control circuit according to claim 1, which is connected to the output circuit.

13. An electronic device comprising a step-up switching regulator according to claim 12.

14. A control circuit for a step-up switching regulator comprising:
a switching terminal to which an inductor is connected;
a switching transistor arranged between the switching terminal and a ground terminal;
a feedback terminal configured to receive a feedback voltage that corresponds to an output voltage of the step-up switching regulator;
an error amplifier configured to amplify the difference between the feedback voltage and a predetermined reference voltage so as to generate an error voltage;
a pulse modulator configured to generate a pulse signal having a duty ratio that is adjusted according to the error voltage;
a driver configured to drive the switching transistor according to the pulse signal; and
an overvoltage detection circuit configured to compare the voltage at the switching terminal with a predetermined threshold voltage, and to generate an overvoltage protection signal which is asserted when the voltage at the switching terminal becomes higher than the threshold voltage, wherein, when the overvoltage protection signal is asserted while the switching transistor is off, the control circuit is configured to perform a predetermined protection operation, wherein the overvoltage detection circuit comprises a switch arranged between two resistors and configured to perform a switching operation in a manner complementary to the switching operation of the switching transistor.

15. The control circuit according to claim 14, wherein the overvoltage detection circuit comprises:
at least one Zener diode and a resistor sequentially arranged in series between the switching terminal and the ground terminal such that each cathode thereof is positioned on the switching terminal side; and
a comparator configured to compare an electric potential at a connection node that connects the resistor and the Zener diode with a predetermined threshold voltage, wherein the overvoltage detection circuit is configured to output the overvoltage protection signal that corresponds to an output voltage of the comparator.

16. The control circuit according to claim 15, wherein the comparator comprises an impedance element and a transistor sequentially arranged in series between a power supply terminal and the ground terminal such that an electric potential at a connection node that connects the resistor and the Zener diode is input to a control terminal of the transistor.

17. The control circuit according to claim 14, wherein the overvoltage detection circuit comprises:
two resistors sequentially arranged in series between the switching terminal and the ground terminal; and
a comparator configured to compare an electric potential at a connection node that connects the two resistors with a predetermined threshold voltage; and
wherein the overvoltage detection circuit is configured to output the overvoltage protection signal that corresponds to an output voltage of the comparator.

18. The control circuit according to claim 17, wherein the overvoltage detection circuit comprises: a diode arranged instead of the higher-voltage side resistor of the aforementioned two resistors; and a capacitor arranged in parallel with the lower-side resistor of the aforementioned two resistors.

* * * * *